US006169550B1

(12) United States Patent
Jain

(10) Patent No.: US 6,169,550 B1
(45) Date of Patent: *Jan. 2, 2001

(54) OBJECT ORIENTED METHOD AND SYSTEM TO DRAW 2D AND 3D SHAPES ONTO A PROJECTION PLANE

(75) Inventor: Rajiv Jain, San Jose, CA (US)

(73) Assignee: Object Technology Licensing Corporation, Cupertino, CA (US)

( * ) Notice: Under 35 U.S.C. 154(b), the term of this patent shall be extended for 0 days.

This patent is subject to a terminal disclaimer.

(21) Appl. No.: 09/256,744

(22) Filed: Feb. 24, 1999

Related U.S. Application Data

(63) Continuation of application No. 08/665,940, filed on Jun. 19, 1996, now Pat. No. 5,877,768.

(51) Int. Cl.[7] .................................................. G06T 15/40
(52) U.S. Cl. ........................ 345/421; 345/419; 345/433; 345/434; 345/435; 345/422
(58) Field of Search .................................... 345/419, 422, 345/433–435, 421

(56) References Cited

U.S. PATENT DOCUMENTS

| | | | |
|---|---|---|---|
| 4,821,220 | 4/1989 | Duisberg | 364/578 |
| 4,953,080 | 8/1990 | Dysart et al. | 364/200 |
| 5,010,502 | 4/1991 | Diebel . | |
| 5,041,992 | 8/1991 | Cunningham et al. | 364/518 |
| 5,050,090 | 9/1991 | Golub et al. | 364/478 |

(List continued on next page.)

FOREIGN PATENT DOCUMENTS

| | | |
|---|---|---|
| 0633533 | 11/1995 | (EP) . |
| 2219470 | 6/1989 | (GB) . |

OTHER PUBLICATIONS

Dumas, Joseph and Page Parsons. "Discovering the Way Programmers Think: New Programming Environments." *Communications of the ACM*, Jun. 1995: pp. 45–56.

Pascoe, Geoffrey A. "Encapsulators: A New Software Paradigm in Smalltalk–80." *OOPSLA '86 Proceedings*, Sep. 1986: pp. 341–346.

Purtilo, James M. and Joanne M. Atlee, "Module Reuse by Interface Adaptation," *Software—Practice and Experience*, Jun. 1991: pp. 539–556.

(List continued on next page.)

*Primary Examiner*—Mark R. Powell
*Assistant Examiner*—Motilewa Good-Johnson
(74) *Attorney, Agent, or Firm*—Kudirka & Jobse, LLP

(57) ABSTRACT

A computer method draws overlapped two-dimensional shapes and two-dimensional projections of three-dimensional shapes onto a projection plane in a system of world coordinates X,Y,Z. The method instantiates a plurality of two-dimensional geometry class objects, each of which includes an order attribute specifying an overlapped position for depicting a corresponding two-dimensional shape on a projection plane positioned orthogonally to the Z coordinate of the world coordinate system. The method instantiates a three-dimensional geometry class object including a Z-value for a position along the Z world coordinate of the three-dimensional shape. The method sorts the plurality of two-dimensional geometry class objects by their respective order attributes in a sorting table in the memory. The method sorts the three-dimensional geometry class object by its Z-value in the sorting table and orders it in a composite order with the two-dimensional class objects in the sorting table. The method then draws the two-dimensional shapes and two-dimensional projections of the three-dimensional shapes onto the projection plane in the composite order of the sorting table, to depict an overlapped appearance of the shapes.

24 Claims, 8 Drawing Sheets

U.S. PATENT DOCUMENTS

| | | | |
|---|---|---|---|
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Copien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,175,806 | 12/1992 | Muskovitz . | |
| 5,181,162 | 1/1993 | Smith et al. | 364/419 |
| 5,297,284 | 3/1994 | Jones et al. | 395/700 |
| 5,305,430 | 4/1994 | Glassner . | |
| 5,315,692 | 5/1994 | Hansen . | |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |
| 5,333,245 | 7/1994 | Vecchione . | |
| 5,339,430 | 8/1994 | Lundin et al. | 395/700 |
| 5,339,438 | 8/1994 | Conner et al. | 395/700 |
| 5,359,704 | 10/1994 | Rossignac . | |
| 5,371,845 | 12/1994 | Newell . | |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,463,722 | 10/1995 | Venolia . | |
| 5,497,452 | 3/1996 | Shimizu . | |
| 5,499,330 | 3/1996 | Lucas . | |
| 5,511,153 | 4/1996 | Azarbayejani . | |
| 5,581,672 | 12/1996 | Letcher, Jr. | 354/420 |
| 5,594,850 | 1/1997 | Noyama et al. | 345/433 |
| 5,627,949 | 5/1997 | Letcher et al. | 345/420 |
| 5,682,462 | 10/1997 | Fortenbery et al. | 345/419 |

OTHER PUBLICATIONS

Lam, Siman S. "Protocol Conversion." *IEEE Transactions on Software Engineering*, Mar. 1988: pp. 353–362.

Thatte, Satish R. "Automated Synthesis of Interface Adapters for REusable Classes," *POPL '94*, Jan. 1994: pp. 174–187.

Yellin, Daniel M. and Robert E. Strom. "Interfaces, Protocols and the Semi–Automatic Construction of Software Adaptors," *OOPSLA '94*, Oct. 1994: pp. 176–190.

Jacobson, Ivar and Fredrik Lindstrom. "Re engineering of old systems to an object–oriented architecture." *OOPSLA '91*, pp. 340–350.

Filman, Robert E. "Retrofitting Objects." *OOPSLA '87*, Oct. 1987: pp. 342–353.

Dietrich, Walter C., Lee R. Nackman and Franklin Gracer. "Saving a Legacy with Objects." *OOPSLA '89*, Oct. 1989: 77–83.

Dotts, Alan and Don Birkley. "Development of Reusable Test Equipment Software Using Smalltalk and C." *OOPSLA '92*, Oct. 1992: pp. 31–35.

Duntemann, Jeff and Chris Marinacci. "New Objects for Old Structures." *BYTE*, Apr. 1990: pp. 261–266.

Alabiso, Bruno. "Transformation of Data Flow Analysis Models to Object–Oriented Design." *OOPSLA '88*, Sep. 1988: pp. 335–353.

Madhavji, Nazim H., Jules Desharnais, Luc Pinsonneault, and Kamel Toubache. "Adapting Modules to an Integrated Programming Environment." *IEEE International Conference on Programming Languages*, 1988: pp. 364–371.

Dutt, Nikil D. "Legend: A Language for Generic Component Library Description." *IEEE International Conference on Computer Languages*, 1990: 198–207.

Foley, James D., et al, "Computer Graphics: Principles and Practices," Addison–Wesley Publishing Co., $2^{nd}$ ed. pp. 649–701, 1990.

Drake, F. et al., "Objects and Images," *Computer Systems*, Jan. 1990, vol. 10, No. 1, pp. 31–32.

TPICTURE OBJECT 400

ORDER SORTING TABLE

| OBJECT | Z-VALUE | ORDER |
|---|---|---|
| OBJECT_A | Z=0 | ORDER=1 |
| OBJECT_B | Z=0 | ORDER=2 |
| OBJECT_C | Z=4 | ORDER SET=3 |

TPICTURE OBJECT 400

ORDER SORTING TABLE

| OBJECT | Z-VALUE | ORDER |
|---|---|---|
| OBJECT_D | Z=-3 | ORDER SET=-1 |
| OBJECT_A | Z=0 | ORDER=1 |
| OBJECT_B | Z=0 | ORDER=2 |

OBJECT ORIENTED METHOD AND SYSTEM TO DRAW 2D AND 3D SHAPES ONTO A PROJECTION PLANE

CROSS-REFERENCES TO RELATED APPLICATIONS

This is a 37 C.F.R. §1.53(b) continuation of application Ser. No. 08/665,940 filed on Jun. 19, 1996 and now issued as U.S. Pat. No. 5,877,768.

FIELD OF THE INVENTION

The invention broadly relates to data processing systems and methods and more particularly relates to object oriented graphics drawings.

BACKGROUND OF THE INVENTION

Related Patents:

The invention disclosed herein is related to the invention described in U.S. Pat. No. 5,455,599 by Cabral et al. entitled "Object Oriented Graphic System", assigned to the same assignee as the invention disclosed herein and incorporated herein by reference.

Prior art computer drawing methods handle the projection of three dimensional shapes onto two dimensional projection planes by forming fixed resolution images of the projection. If the resultant image is scaled to a larger size, the fixed resolution of the image results in a grainy appearance. If the scene to be depicted contains both three-dimensional shapes as well as two-dimensional shapes, the three-dimensional shape must be projected onto a projection plane from the vantage point of a viewer of the scene. The projection of the three-dimensional shape and the two-dimensional shapes must be shown properly overlapped. Once again, the prior art computer drawing methods form a fixed image of the overlapped shapes on the projection plane. If the scene is changed by moving the three-dimensional shape or by moving the vantage point, there is no information in the fixed image to reconstruct the projection of the scene on the projection plane and maintain a proper overlapped appearance of the shapes.

SUMMARY OF THE INVENTION

The invention is a computer method, a computer system, and an article of manufacture for use in a computer system. The invention draws overlapped two-dimensional shapes and two-dimensional projections of three-dimensional shapes onto a projection plane in a system of world coordinates X,Y,Z. The two-dimensional and three-dimensional geometry class objects contain enough information to enable the reconstruction of the projection of the scene on the projection plane if the scene is changed by moving the three-dimensional shape or by moving the vantage point. The invention finds application preferably in an object-oriented graphic system that includes a processor, a memory, a graphic output device, and a drawing protocol object in the memory.

The method of the invention instantiates a plurality of two-dimensional geometry class objects in the memory representing two-dimensional shapes. Each two-dimensional geometry class object includes an order attribute specifying an overlapped position for depicting a corresponding two-dimensional shape on a projection plane positioned orthogonally to the Z coordinate of the world coordinate system;

The method of the invention further includes the step of instantiating a three-dimensional geometry class object in the memory representing a three-dimensional shape, the three-dimensional geometry class object including a Z-value for a position along the Z world coordinate of the three-dimensional shape;

The method of the invention sorts the plurality of two-dimensional geometry class objects by their respective order attributes in a sorting table in the memory;

The method of the invention includes the step of sorting the three-dimensional geometry class object by its Z-value in the sorting table in the memory and ordering it in a composite order before the two-dimensional class objects in the sorting table if the Z-value for the three-dimensional shape places the projection plane between the three dimensional shape and a scene-viewing position in the world coordinate system;

The method of the invention alternately sorts the three-dimensional geometry class object by its Z-value in the sorting table in the memory and ordering it in the composite order after the two-dimensional class objects in the sorting table if the Z-value for the three-dimensional shape places it between the projection plane and the scene-viewing position in the world coordinate system;

The method of the invention then draws with the graphic output device, the two-dimensional shapes and two-dimensional projection of the three-dimensional shape onto the projection plane in the composite order of the sorting table, to depict an overlapped appearance of the shapes.

DESCRIPTION OF THE FIGURES

The invention can be more fully appreciated with reference to the accompanying figures.

FIG. 4A is an instantation of the TPicture class as a TPicture object showing in particular the order sorting table which corresponding to FIG. 1A.

FIG. 4B is a second instantation of TPicture as the TPicture object showing in particular the order sorting table corresponding to FIG. 1C.

DISCUSSION OF THE PREFERRED EMBODIMENT

Figure 1A:
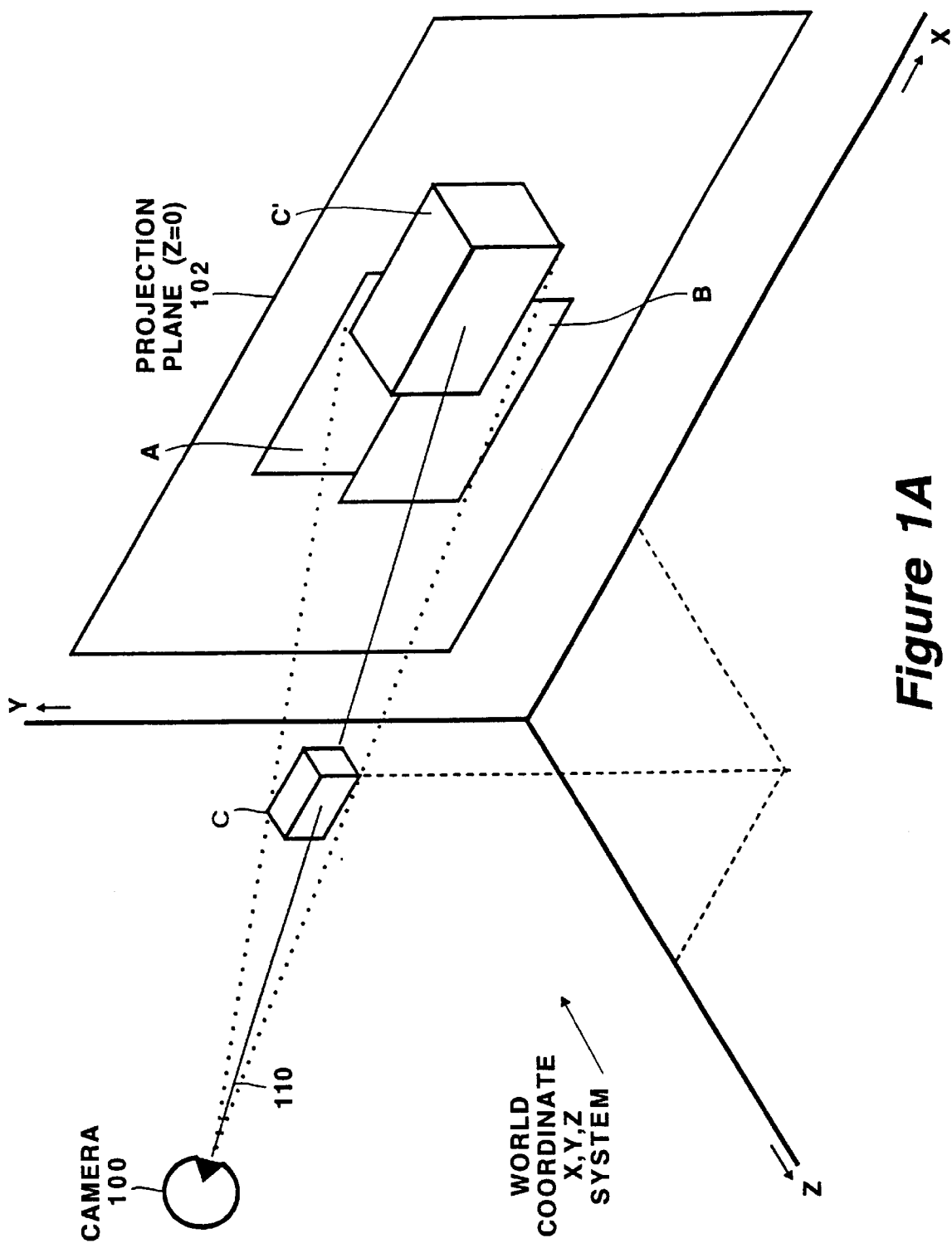
FIG. 1A illustrates a world coordinate system with the coordinates X, Y, and Z and a first arrangement of a camera 100 and projection plane 102 upon which is projected a 2D projection of a 3D shape C along with the depiction of 2D shapes A and B.

FIG. 1A illustrates the problem solved by the invention. In the world coordinate system, the coordinates X, Y, and Z are respectively orthogonal and describe the relative position of the camera 100, the projection plane 102, and 3D shape C. The camera 100 is located at the scene-viewing position. The projection plane 102 is located at the Z value of 0 and is the plane upon which 2D shapes such as A and B are depicted.

The problem addressed by the invention is the proper depiction of the 2D projection onto the projection plane 102 of the 3D shape C located somewhere in the world coordinate system outside of the projection plane 102. The depiction of the 2D projection C' of the 3D shape C with respect to the depiction of the 2D shapes A and B depends upon the relative position of the 3D shape C along the Z coordinate axis. If the 3d shape C has Z coordinate values which are positive, then the 2D projection C' must appear to overlap the 2D shapes A and B depicted on the projection plane 102. A further complication in the proper depiction of the shapes on the projection plane 102 is the relative overlapping of respective 2D shapes A and B. The user must designate an order for the appearance of 2D objects in the projection 102. That order must be preserved when the shapes are drawn on the projection plane 102.

This is accomplished by choosing the sequence for drawing the shapes to be the same as the overlapped order for the snapes. Those 2D shapes which are to appear as being overlapped by other shapes, must be drawn first. As is shown in FIG. 1A, the shape A whose order designation is lower than the shape B, must be drawn first on the projection plane 102 so that when the subsequent drawing of the 2D shape B is carried out, the appropriate overlapped appearance of B over A will occur. The invention disclosed herein accomplishes the ordered drawing of both 2D shapes within the projection 102 and the 2D projection of 3D shapes onto the projection plane, taking into consideration the relative position of the 3D shapes along the Z axis of the world coordinate system. In FIG. 1A since the 3D shape C has a positive Z value, the 2D projection C' of the 3D shape C will appear to overlap the 2D shapes A and B, if the visual ray 110 from the camera 100 to the point of interest on the 3D shape C projects to an area which will be seen to overlap the 2D shapes A and B on the projection plane. The projection of the 3D shape onto the projection plane shown in FIG. 1A is a perspective projection, using visual rays that diverge from the camera 100. However, an orthogonal projection can also be used for projecting the 3D shape onto the projection plane, where the visual rays from the scene-viewing position along the Z-axis are mutually parallel and are perpendicular to the projection plane.

Figure 1B:
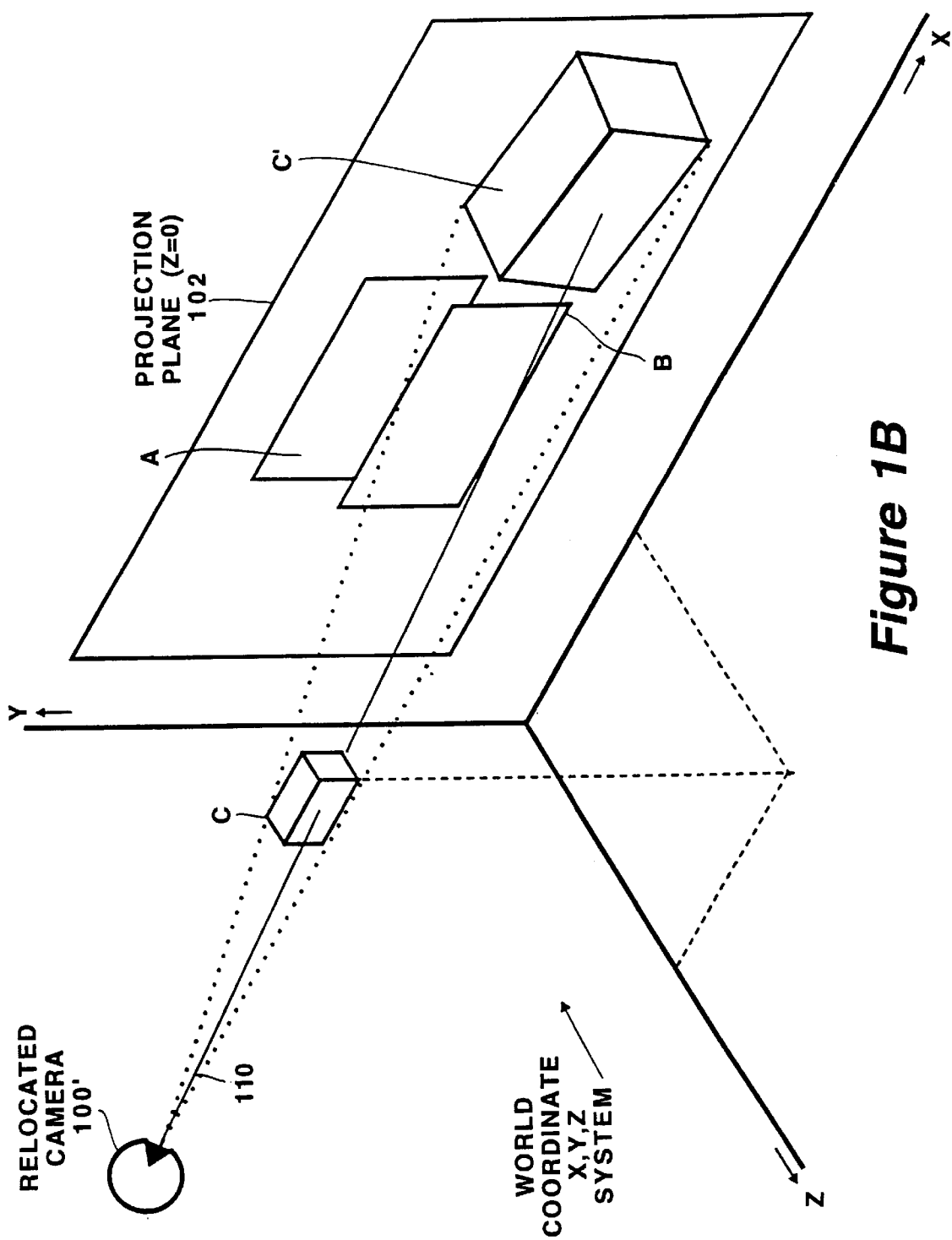
FIG. 1B illustrates the world coordinate system of FIG. 1a wherein the camera has been relocated with respect to the coordinate system, thereby positioning the projection of the 3D shape C at a different location on the projection plane with respect to the location the 2D shapes A and B.

FIG. 1B illustrates a variation in arrangement of the relocated camera 100 in the world coordinate system of FIG. 1A. Because the visual ray 110 from the relocated camera 100' projects through 3D shape C onto the projection plane in an area outside of the depiction for the 2D shapes A and B, the 2D projection C' is shown to not overlap the 2D shapes A and B. The invention is able to carry out the appropriate depiction of both the 2D shapes A and B and the 2D projection C' of the 3D shape C.

Figure 1C:
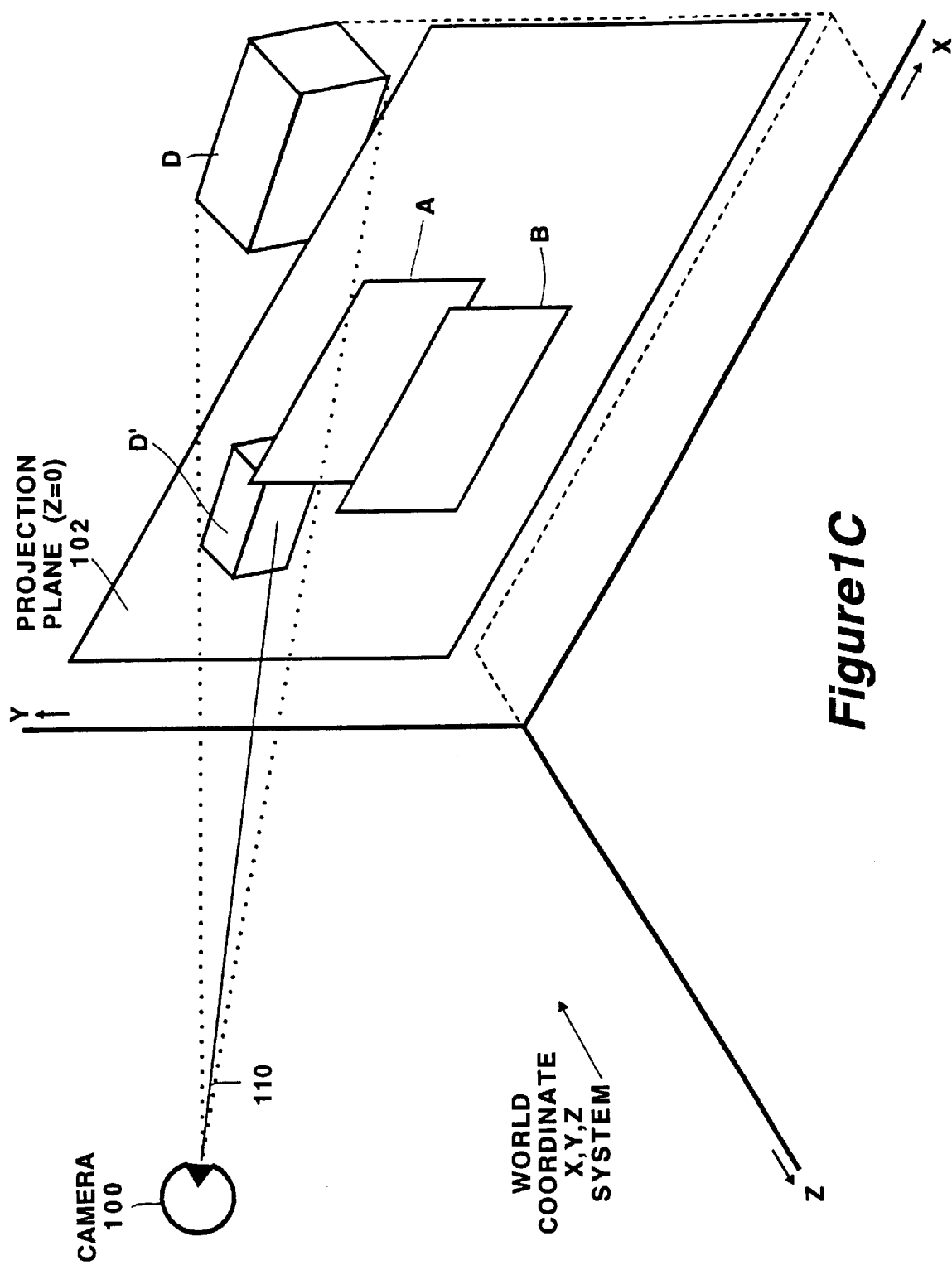
FIG. 1C illustrates another arrangement in the world coordinate system of FIG. 1A wherein a 3D shape D is located behind the projection plane 102 and its 2D projection onto the projection plane is depicted as being overlaid by the 2D objects A and B.

FIG. 1C illustrates the handling of the projection of the 3D object D in the world coordinate system, which has a negative Z value. The 3D shape is shown to appear behind the projection plane 102. The 2D projection D' of the 3D shape D will appear to be overlapped by the 2D shape A on the projection plane 102, in accordance with the invention.

Figure 2:
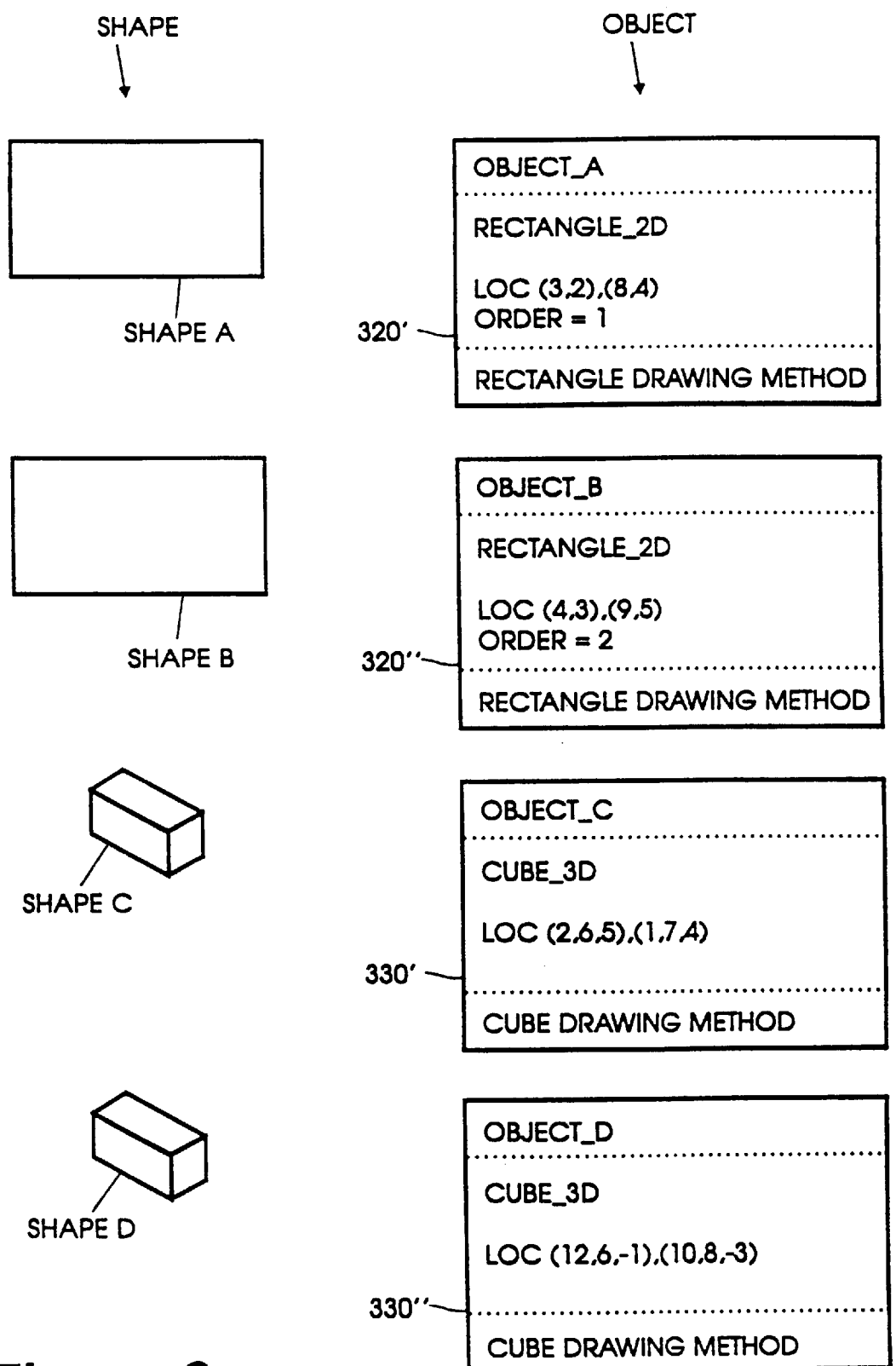
FIG. 2 illustrates the 2D rectangle shape A and its corresponding object—A, 2D shape B and its corresponding object—B, the 3D shape C and its corresponding object C, and the 3D shape D and its corresponding object—D.
Figure 3:
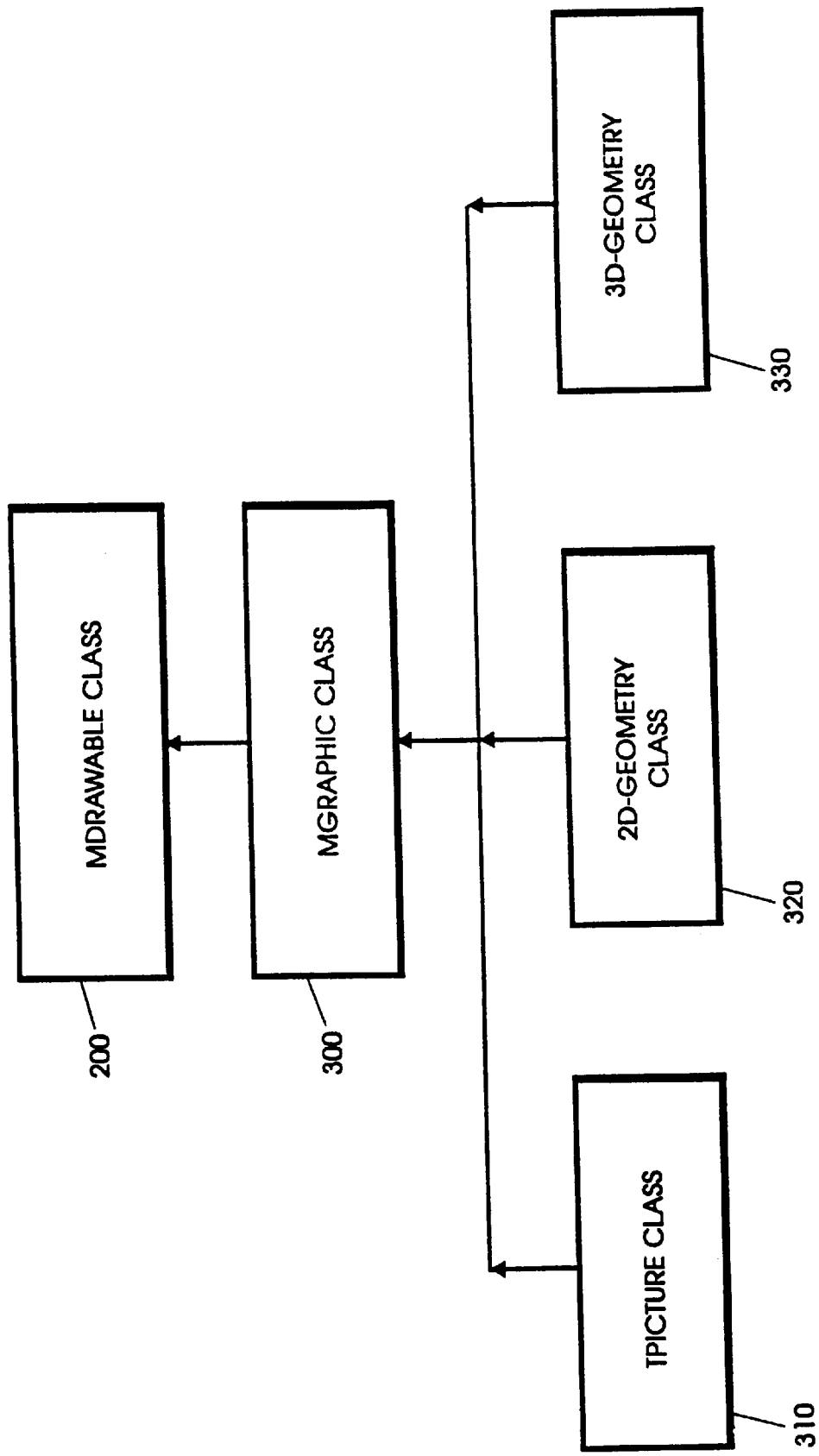
FIG. 3 is a Booch diagram illustrating the relationship between the MDrawable class, the Mgraphic class and the subclasses of TPicture class, 2D-geometry class, and 3D-geometry class.

FIG. 2 illustrates the 2D rectangular shapes A and B and the 3D cubic shapes C and D and their corresponding geometry class objects. The object oriented MGraphic class 300 shown in FIG. 3 is a modification of the MGraphic modeling layer described in U.S. Pat. No. 5,455,599 cited above and incorporated herein by reference. The MGraphic class 300 includes the subclasses shown in FIG. 3 including the TPicture class 310, the 2D-Geometry class 320, and the 3D-Geometry class 330. The instantation of the TPicture class 310 forms the TPicture object 310' shown in FIGS. 4A, 4B, and 5. The instantation of the 2D-Geometry class 320 forms the object-A 320' and the object-B 320" of FIG. 2, which correspond to shape A and shape B, respectively. The instantation of the 3D-Geometry class 330 of FIG. 3 forms the object-C 330' and the object-D 330" in FIG. 2, corresponding to the shape C and the shape D.

FIG. 3 also shows the MDrawable class 200, described in U.S. Pat. No. 5,455,599 cited above and incorporated herein by reference. The MGraphic class 300 is an abstract base class that derives from the MDrawable class 200. MDrawable provides the protocol for drawing a 2-D or 3-D graphic, and together with the MGraphic class 300 and the TPicture class 310, provides the protocol for all 2-D and 3D graphics: obtaining attribute information, transforming the graphic, finding the bounds of the graphic, and detecting whether the graphic has been selected by the user (hit detection). FIG. 3 shows the class relationships for MGraphic and MDrawable. MDrawable has a pure virtual Draw function that is implemented in the MGraphic derived classes.

The 2D rectangular shape A has its object-A 320' include the shape type attribute which is a rectangle-2D. The object 320' also includes the location of the shape A on the projection plane 102 which is designated by the (X,Y) coordinates (3,2), (8,4) which indicates the diametric vertices of shape A on the projection plane 102. In accordance with the invention, the order value of "1" for shape A as it is to appear on the projection plane 102, is also included in its object-A 320'. In addition, the sequence of executable instructions forming the rectangle drawing method are included in the object-A 320'. When the 2D-Docket Geometry object-A 320' is instantated, execution of the rectangle drawing method will draw the shape A onto the projection plane 102 in FIGS. 1A, 1B or 1C.

Object-B 320" corresponds to shape B and the geometric type attribute designated in object 320" indicates that it is a rectangle-2D. Its corresponding location on the projection plane is also provided. In accordance with the invention, the order value for shape B is an order value of "2" which will cause the appearance of shape to overlap the appearance of shape A as they are drawn on the projection plane 102 in FIGS. 1A, 1B, and 1C. The rectangle drawing method is included in object 320", which when executed, draws the rectangular shape B on projection plane 102.

The instantation of the 3D-Geometry class 320 will form the object-C of FIG. 2 which is object-C 330' . The designation of object 330' is a cube-3D type geometry. The location (X,Y,Z) of the diametric vertices for the cubic shape C defined by object-C 330' is location (2,6,5), (1,7,4). This positions the 3D cube C at a positive Z position with respect to the projection plane 102, as is shown in FIGS. 1A and 1B. The cube drawing method in object-C 330' will process the coordinates for the location of the camera 100 with respect to the projection plane 102 in the world coordinate system of FIG. 1A and will project the 2D shape C' of the 3D cube C onto the projection plane 102. In accordance with the invention, in FIG. 1A where the visual ray 110 projects into an area which overlaps both 2D shapes A and B, the 2D projection C' of the 3D shape C will be shown to overlap the 2D shapes A and B.

The object-D 330" corresponding the cubic shape D is designated by its geometric type attribute as a cube-3D geometry type. The location (X,Y,Z) of the diametric vertices of the cubic shape D is specified in object-D 330" as the location (12,6,–1), (10,8,–3). The negative Z values for the location of the cubic shape D in the world coordinate system specified in the object-D 330" indicate that the object-D is positioned behind the projection plane 102 with respect to the position of the camera 100, as is shown in FIG. 1C. The execution of the cube drawing method in object-D 330" will draw the 2D shape D' of the 3D cube D so as to appear to be overlapped by the 2D shape A on the projection plane 102., as is shown in FIG. 1C.

The handling of the proper overlapped appearance of 2D and 3D objects onto the projection plane 102 is carried out by the TPicture object 310' which is instantated from the Tpicture class 310 of FIG. 3. FIG. 4A shows TPicture object 310' with the order sorting table 400 which is a part of the TPicture object 310'. The order sorting table 400 is compiled by the sorting method 500, which is part of the executable instruction code in TPicture object 310'.

Figure 5:
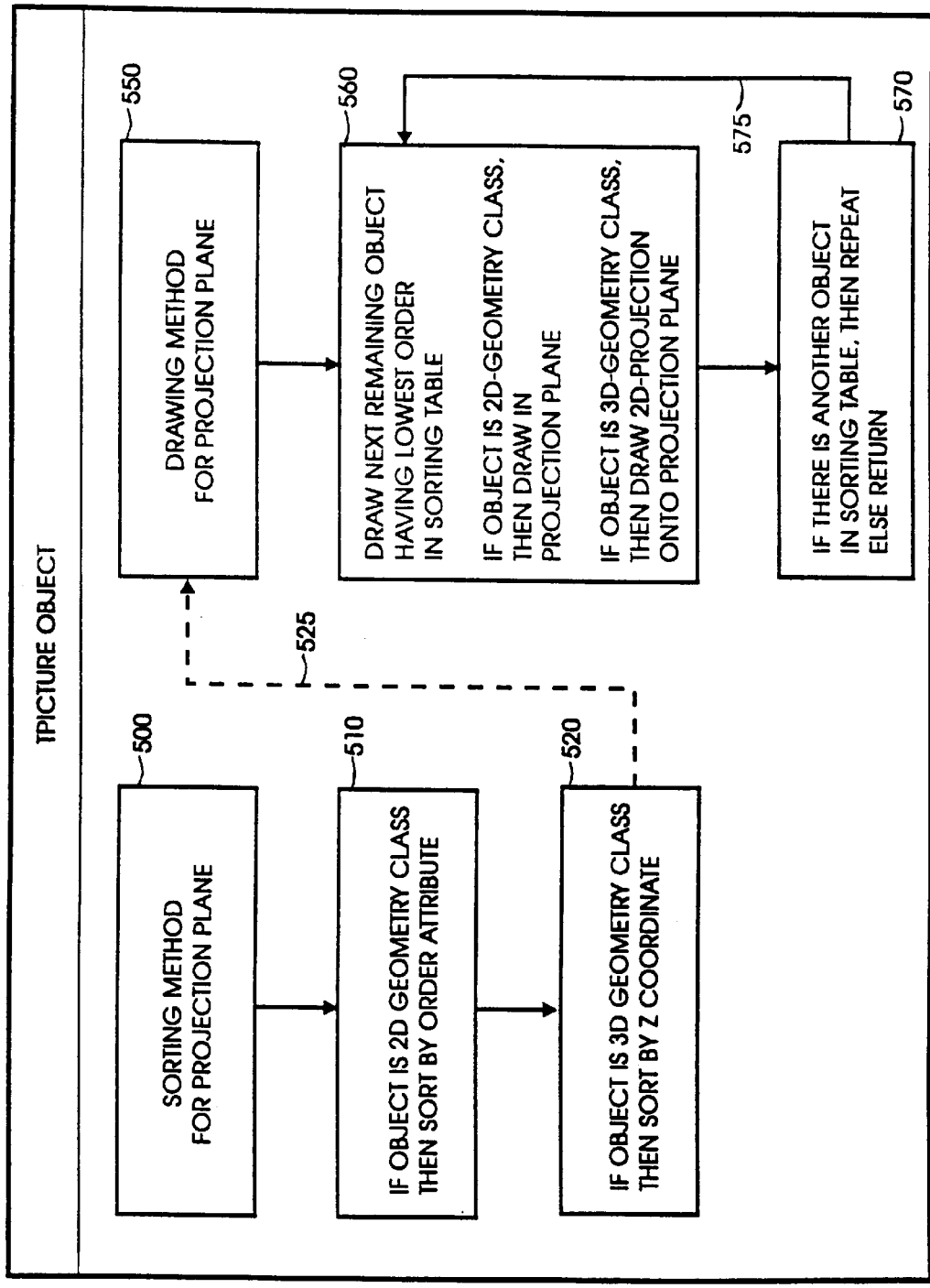
FIG. 5 illustrates the instantation of TPicture class as the TPicture object showing in particular the sorting method for the projection plane and the drawing method for the projection plane.

The sorting method 500 is shown in FIG. 5. In step 510, if an object, such as object-A 320' is a 2D-Geometry class object then it is sorted by its order attribute. This can be seen in FIG. 4A where the order sorting table 400 shows object-A as having a Z value of 0 and an order value equal to 1. Thus, object-A is positioned first an order sorting table 400. This is followed by the positioning of object-B in the order sorting table 400, which has a Z value of 0 and an order value of 2, as can be seen from the object-B 320" of FIG. 2. Object-C shown in order sorting table 400 of FIG. 4A, is determined by the sorting method 500 of FIG. 5, to not be a member of the 2D-Geometry class, as is determined in step 510. The sorting method 500 of FIG. 5 then passes to step 520 which determines if an object is a member of the 3D-Geometry class, and if it is, then it sorted by its Z coordinate. As can be seen in the order sorting table 400 of FIG. 4A, object-C has a Z value of 4 and therefore, in accordance with the invention, the sorting method 500 sets its order value equal to 3, a magnitude which is greater than the order value for the preceding objects listed in the order sorting table of FIG. 400.

Later in time, as is seen by the dotted path 525 FIG. 5, the drawing method 550 will be executed in TPicture object 310'. In step 560, the step draws the next remaining object having the lowest order in the order sorting table 400 of FIG. 4A. If the object is a 2D-Geometry class object, then it is drawn in the projection plane in the order of its occurrence in the order sorting table 400. Thus, since object-A occurs first because it has an order value of 1, it is the first object to be drawn on the projection plane 102, as shape A.

Then in step 570, the drawing method for the projection plane of FIG. 5, determines if there is another object in the sorting table and if there is, then it repeats by following 575 back to step 560, otherwise the drawing method returns to the main program. In the order sorting table 400 of FIG. 4A, the next object is object B and step 560 determines if object-B is a 2D-Geometry class object which can be determined by its characterization in object-B 320" shown in FIG. 2. Then step 560 draws the 2D object B on the projection plane 102. Since, the shape B is drawn on the projection plane after the shape A, if the two shapes intersect one another, then shape B will be shown as overlapping shape A, as is desired.

Then step 570 determines if there is another object in the sorting table 400. Since object-C occurs next in the sorting table 400 of FIG. 4A, step 560 of FIG. 5 is repeated again. Step 560 draws the next remaining object having the lowest order in the sorting table and in this case it is object-C. Step 560 determines if the object is a 3D-Geometry class object, then its 2D projection is drawn onto the projection plane 102. The projection can be a perspective projection, or alternately an orthogonal projection. Since the 2D projection C' of the cubic shape C is drawn at a time later than the drawing of the 2D shapes A and B, the 2D projection C' is shown to overlap the 2D shapes A and B on the projection plane 102, as is desired. Thus, in accordance with the invention, an orderly handling of the consecutive drawing of overlapped 2D and 3D projections onto the projection plane 102 is provided by the invention.

Turning now to FIG. 4B and the corresponding FIG. 1C, the order sorting table as shown with the handling of the 3D object and the 3D shape D carrying negative Z coordinate values. In accordance with the invention, the sorting method 500 will once again sort object-A as a 2D-Geometry class object and assign it order 1 as is designated by the attribute in the object 320'. Correspondingly, the sorting method 500 will order the object B in a sorting table 400 in FIG. 4B to follow object A, because its designated order value of "2" is greater than the designated order value of "1" for object-A. Then the sorting method 500 handles object-D. Step 520 determines that if the object is a 3D-Geometry class object, then it is sorted by Z coordinate. Object-D 330" has Z values which are negative, indicating that it appears behind the projection plane 102. Accordingly, step 520 sorts object-D by assigning an order value which is less than the existing order values in the order sorting table 400 of FIG. 4B. Since the existing assignment for object-A has an order value of "1", step 520 assigns an order value of "–1" to object-D, thereby placing object D at the head of the list. This will cause object-D to be drawn by the drawing method 550 prior to the drawing of the 2D objects A and B. When the drawing method 550 is executed, the first object encountered in the order sorting table 400 is the 3D object-D. Step 560 determines if the object is a member of the 3D-Geometry class, and it then it draws its 2D projection onto the projection plane 102. This can be a perspective or an orthogonal projection. This results in the drawing of the 2D shape D' on the projection plane 102, as shown in FIG. 1C. Then the drawing method 550 draws the shape A for object-A 320' followed by the shape B for object B 320" onto the projection plane 102. This results in the overlapped appearance where shape A is shown to overlap the 2D projection D' of the 3D shape D on the projection plane, as is desired.

Thus, the invention disclosed herein provides an orderly method for handling the 2D depiction of shapes corresponding the both 2D and 3D shapes which appear in the world coordinate system.

Figure 6:
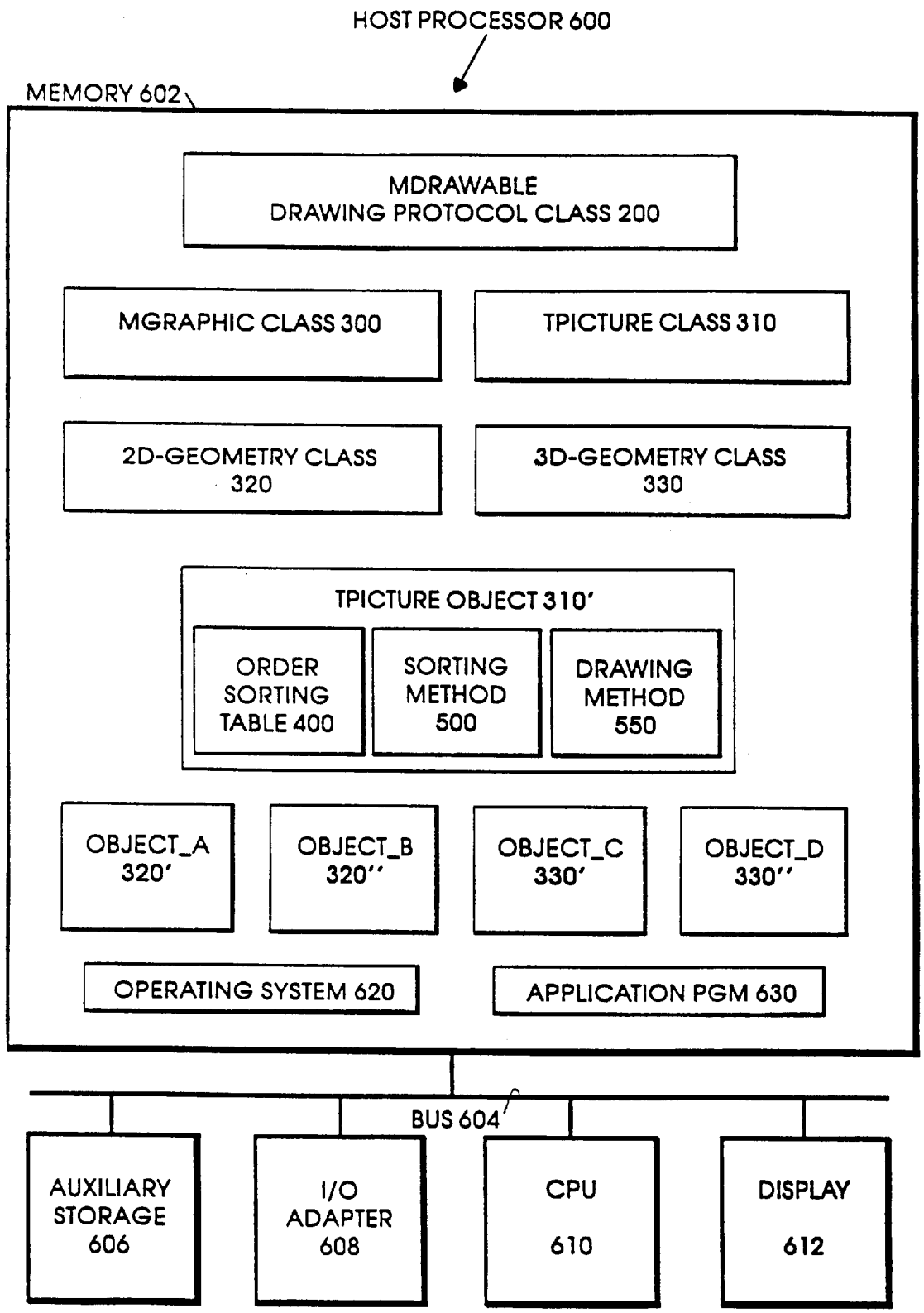
FIG. 6 is a system block diagram of a system embodiment of the invention.

FIG. 6 is a block diagram of a system embodiment of the invention. the host processor 600 includes the RAM memory 602, connected by the bus 604 to the auxiliary storage 606 which may be a magnetic hard drive, a floppy disk drive, or other bulk storage device. A floppy disk drive 606 can write the computer readable program code embodying the invention, onto a computer useable medium such as a magnetic, floppy disk, thereby forming an article of manufacture, in accordance with the invention. Bus 604 also connects memory 602 to the I/O adapter 608 that can connect to various graphic output devices such as a graphic CRT display, a plotter, a vector engine, a page description language, a graphic accelerator, a frame buffer, or other graphical output device, as described in U.S. Pat. No. 5,455,599 cited above and incorporated herein by reference. Bus 604 also connects to the CPU 610 and to the display 612. The memory 602 stores executable instructions within the classes, objects, and programs stored therein and that executable code is executed by the CPU 610 to carry out the method of the invention.

The auxiliary storage 606 loads the memory 602 with the MDrawable class 200 and the MGraphic class 300, as described in U.S. Pat. No. 5,455,599 cited above and incorporated herein by reference. The auxiliary storage 606 also loads the memory 602 with the TPicture class 310, the 2D-geometry class 320, and the 3D-geometry class 330. The auxiliary storage 606 also loads the memory 602 with the operating system 620, as described in U.S. Pat. No. 5,455, 599 cited above and incorporated herein by reference. The auxiliary storage 606 also loads the memory 602 with the application program 630, which can be, for example, a graphics editing program. The user can design a scene, for example FIG. 1A, with the example graphical editing application program 630, specifying the scene attributes of the position of the camera 100 and the location of the projection plane 102, and specifying the geometric type and location of two-dimensional and three-dimensional shapes to be depicted. Then, when the TPicture object 310', the 2D-geometry objects 320' and 320", and the 3D-geometry objects 330' and 330" are instantiated in memory 602 from TPicture class 310, the 2D-geometry class 320, and the 3D-geometry class 330, respectively, the scene description entered by the user will become attributes stored in these objects. The scene description of the position of the camera 100 and the location of the projection plane 102 in the world coordinates X,Y,Z become attributes stored in the TPicture object 310'. The geometric type and location description of two-dimensional shapes A and B become attributes of the 2D-geometry objects 320' and 320". And the geometric type and location description of three-dimensional shape C become attributes of the 3D-geometry object 330'.

The CPU 610 executes the instructions contained in the sorting method 500 and the drawing method 550 of TPicture object 310' of FIG. 5, and the resulting composite drawing is drawn on the display 612 or other graphical output devices connected to the I/O adapter 608.

A preferred mode for implementing the invention is fully described in the addendum to the specification, which is found prior to the claims to the invention and which forms a part of this application. The addendum is the book entitled "2-D and 3-D Graphics—CommonPoint Application System". The book is part of the documentation that accompanied the CommonPoint Application System product announced by Taligent, Inc. on Jun. 20, 1995 and made publicly available in July 1995.

Although a specific embodiment of the invention has been disclosed, it will be understood by those having skill in the art that changes can be made to that specific embodiment without departing from the spirit and the scope of the invention.

What is claimed is:

1. A method for enabling drawing by a computer having a processor, a memory, and a graphic output device, of overlapped two-dimensional shapes and two-dimensional projections of three-dimensional shapes onto a projection plane for viewing from a scene-viewing position in a system of world coordinates (X, Y, Z) wherein the projection plane is disposed orthogonally at a Z-position on the world Z-coordinate, the method comprising the steps of:

(a) providing class libraries for storage in the computer memory from which (1) a two-dimensional geometry object may be instantiated to represent a two-dimensional shape and having an order attribute representing an overlapping position for depicting the two-dimensional shape on the projection plane positioned orthogonally to the world Z-coordinate, and (2) a three-dimensional geometry object may be instantiated to represent a three-dimensional shape and having a Z-value representing a position of the three-dimensional shape on the world Z-coordinate; and (b) providing a run-time environment to (1) support the instantiation of the two-dimensional and three-dimensional geometry objects and (2) perform the steps of:

(A) sorting one or more of the two-dimensional geometry objects by their respective order attributes into a sorting table in the memory, (B) inserting one of the three-dimensional geometry objects into the sorting table ahead of the two-dimensional objects if the respective Z-value is such that the projection plane position is between the three-dimensional object and the viewing position, (C) inserting one of the three-dimensional geometry objects into the sorting table behind the two-dimensional objects if the respective Z-value is such that the three-dimensional object is between the projection plane position and the viewing position, and (D) rendering the two-dimensional shapes and the two-dimensional projection of the three-dimensional shape in the composite order of the sorting table to depict an overlapped appearance thereof.

2. The method of claim 1 wherein step (b)(2) comprises instantiating a picture object which includes the sorting table and a method for sorting the two-dimensional geometry objects into the sorting table.

3. The method of claim 2 wherein the picture object further includes a method for inserting the three-dimensional geometry objects into the sorting table.

4. The method of claim 1 wherein step (b)(2) comprises instantiating a graphic object which includes a method for rendering the two-dimensional shapes and the two-dimensional projection of the three-dimensional shape.

5. The method of claim 4 wherein the method for rendering the two-dimensional shapes and the two-dimensional projection of the three-dimensional shape renders each shape with a smaller Z order attribute over other shapes with larger Z order attributes where the shapes overlap.

6. The method of claim 4 wherein the method for rendering the two-dimensional shapes and the two-dimensional projection of the three-dimensional shape begins rendering by selecting a shape in the sorting table which has a largest Z order attribute.

7. The method of claim 6 wherein the method for rendering the two-dimensional shapes and the two-dimensional projection of the three-dimensional shape renders each shape individually and completely before rendering the next shape in the table proceeding from a shape that is farthest away from the viewing position and continuing to a shape that is closest to the viewing position.

8. The method of claim 7 wherein the method for rendering the two-dimensional shapes and the two-dimensional projection of the three-dimensional shape renders each shape individually and completely before rendering the next shape in the table proceeding from a shape with the largest Z order attribute and continuing to a shape with the smallest Z order attribute.

9. Apparatus for enabling drawing by a computer having a processor, a memory, and a graphic output device, of overlapped two-dimensional shapes and two-dimensional projections of three-dimensional shapes onto a projection plane for viewing from a scene-viewing position in a system of world coordinates (X, Y, Z) wherein the projection plane is disposed orthogonally at a Z-position on the world Z-coordinate, the apparatus comprising:

class libraries for storage in the computer memory from which
        (1) a two-dimensional geometry object may be instantiated to represent a two-dimensional shape and having an order attribute representing an overlapping position for depicting the two-dimensional shape on the projection plane positioned orthogonally to the world Z-coordinate, and
        (2) a three-dimensional geometry object may be instantiated to represent a three-dimensional shape and having a Z-value representing a position of the three-dimensional shape on the world Z-coordinate; and
    a run-time environment which includes:
        a mechanism which instantiates the two-dimensional and three-dimensional geometry objects;
        a sorter which sorts one or more of the two-dimensional geometry objects by their respective order attributes into a sorting table in the memory,
        a placement mechanism which inserts one of the three-dimensional geometry objects into the sorting table ahead of the two-dimensional objects if the respective Z-value is such that the projection plane position is between the three-dimensional object and the viewing position, inserts one of the three-dimensional geometry objects into the sorting table behind the two-dimensional object if the respective Z-value is such that the three-dimensional object is between the projection plane position and the viewing position, and
        a renderer which renders the two-dimensional shapes and the two-dimensional projection of the three-dimensional shape in the composite order of the sorting table to depict an overlapped appearance thereof.

10. The apparatus of claim 9 wherein the instantiating mechanism comprises instantiating a picture object which includes the sorting table and a method for sorting the two-dimensional geometry objects into the sorting table.

11. The apparatus of claim 10 wherein the picture object further includes a method for inserting the three-dimensional geometry objects into the sorting table.

12. The apparatus of claim 9 wherein the instantiating mechanism comprises a mechanism for instantiating a graphic object that includes a method for rendering the two-dimensional shapes and the two-dimensional projection of the three-dimensional shape.

13. The apparatus of claim 12 wherein the method for rendering the two-dimensional shapes and the two-dimensional projection of the three-dimensional shape renders each shape with a smaller Z order attribute over other shapes with larger Z order attributes where the shapes overlap.

14. The apparatus of claim 12 wherein the method for rendering the two-dimensional shapes and the two-dimensional projection of the three-dimensional shape begins rendering by selecting a shape in the sorting table which has a largest Z order attribute.

15. The apparatus of claim 14 wherein the method for rendering the two-dimensional shapes and the two-dimensional projection of the three-dimensional shape renders each shape individually and completely before rendering the next shape in the table proceeding from a shape that is farthest away from the viewing position and continuing to a shape that is closest to the viewing position.

16. The apparatus of claim 15 wherein the method for rendering the two-dimensional shapes and the two-dimensional projection of the three-dimensional shape renders each shape individually and completely before rendering the next shape in the table proceeding from a shape with the largest Z order attribute and continuing to a shape with the smallest Z order attribute.

17. A computer program product for enabling drawing by a computer having a processor, a memory, and a graphic output device, of overlapped two-dimensional shapes and two-dimensional projections of three-dimensional shapes onto a projection plane for viewing from a scene-viewing position in a system of world coordinates (X, Y, Z) wherein the projection plane is disposed orthogonally at a Z-position on the world Z-coordinate, the computer program product comprising a computer usable medium having computer readable program code thereon, including:

class libraries for storage in the computer memory from which
        (2) a two-dimensional geometry object may be instantiated to represent a two-dimensional shape and having an order attribute representing an overlapping position for depicting the two-dimensional shape on the projection plane positioned orthogonally to the world Z-coordinate, and
        (2) a three-dimensional geometry object may be instantiated to represent a three-dimensional shape and having a Z-value representing a position of the three-dimensional shape on the world Z-coordinate; and
        program code which instantiates the two-dimensional and three-dimensional geometry objects at runtime;
        program code which sorts one or more of the two-dimensional geometry objects by their respective order attributes into a sorting table in the memory,
        program code which inserts one of the three-dimensional geometry objects into the sorting table ahead of the two-dimensional objects if the respective Z-value is such that the projection plane position is between the three-dimensional object and the viewing position, inserts one of the three-dimensional geometry objects into the sorting table behind the two-dimensional object if the respective Z-value is such that the three-dimensional object is between the projection plane position and the viewing position, and
        program code which renders the two-dimensional shapes and the two-dimensional projection of the three-dimensional shape in the composite order of the sorting table to depict an overlapped appearance thereof.

18. The computer program product of claim 17 wherein the program code for instantiating the two and three dimensional geometry objects comprises program code for instantiating a picture object which includes the sorting table and a method for sorting the two-dimensional geometry objects into the sorting table.

19. The computer program product of claim 18 wherein the picture object further includes a method for inserting the three-dimensional geometry objects into the sorting table.

20. The computer program product of claim 17 wherein the program code for instantiating the two and three dimensional geometry objects comprises program code for instantiating a graphic object that includes a method for rendering the two-dimensional shapes and the two-dimensional projection of the three-dimensional shape.

21. The computer program product of claim 20 wherein the method for rendering the two-dimensional shapes and the two-dimensional projection of the three-dimensional shape renders each shape with a smaller Z order attribute over other shapes with larger Z order attributes where the shapes overlap.

22. The computer program product of claim 20 wherein the method for rendering the two-dimensional shapes and the two-dimensional projection of the three-dimensional shape begins rendering by selecting a shape in the sorting table which has a largest Z order attribute.

23. The computer program product of claim 22 wherein the method for rendering the two-dimensional shapes and the two-dimensional projection of the three-dimensional shape renders each shape individually and completely before rendering the next shape in the table proceeding from a shape that is farthest away from the viewing position and continuing to a shape that is closest to the viewing position.

24. The computer program product of claim 23 wherein the method for rendering the two-dimensional shapes and the two-dimensional projection of the three-dimensional shape renders each shape individually and completely before rendering the next shape in the table proceeding from a shape with the largest Z order attribute and continuing to a shape with the smallest Z order attribute.

* * * * *